(12) United States Patent
Malloggi et al.

(10) Patent No.: US 9,579,616 B2
(45) Date of Patent: Feb. 28, 2017

(54) METHOD FOR DESTABILIZING A PICKERING EMULSION

(75) Inventors: Florent Malloggi, Paris (FR); Antoine Thill, Fontenay aux Roses (FR); Sarah Fouilloux, Le Mesnil Théribus (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 158 days.

(21) Appl. No.: 14/237,761

(22) PCT Filed: Aug. 9, 2012

(86) PCT No.: PCT/IB2012/054067
§ 371 (c)(1),
(2), (4) Date: Mar. 6, 2014

(87) PCT Pub. No.: WO2013/021362
PCT Pub. Date: Feb. 14, 2013

(65) Prior Publication Data
US 2014/0187664 A1    Jul. 3, 2014

(30) Foreign Application Priority Data

Aug. 11, 2011 (FR) ..................... 11 57303

(51) Int. Cl.
*C08F 122/10* (2006.01)
*B01F 17/00* (2006.01)
*B01D 17/04* (2006.01)

(52) U.S. Cl.
CPC ........ *B01F 17/0007* (2013.01); *B01D 17/047* (2013.01); *C08F 122/10* (2013.01)

(58) Field of Classification Search
None
See application file for complete search history.

(56) References Cited

U.S. PATENT DOCUMENTS

2008/0220176 A1* 9/2008 Carlblom .................. C08F 2/22
427/445
2009/0270259 A1* 10/2009 Auweter ................ A01N 25/04
504/359

OTHER PUBLICATIONS

Li et al., "Doubly pH-Responsive Pickering Emulsion," Langmuir 2008, 24, 13237-13240 and further in view of Auweter et al. (US 2009/027059).*
Binks et al., "Influence of Particle Wettability on the Type and Stability of Surfactant-Free Emulsions," Langmuir, 2000, 16, pp. 8622-8631.*
Definition of "Inject" from Dictionary.com. 2016.*
Fujji et al., Hydroxyapatite Nanoparticles as Stimulus-Responsive Particulate Emulsifiers and Building Block form Porous Materials, Journal of Colloid and Interface Science, 315, pp. 287-296, 2007.
Fredrick et al., Factors Governing Partial Coalescence in Oil-In-Water Emulsions, Advances in Colloid and Interface Science, 153, pp. 30-42, 2010.
Yang et al., Effect of Dispersion pH on the Formation and Stability of Pickering Emulsions Stabilized by Layered Double Hydroxides Particles, Journal of Colloid and Interface Science, 306, pp. 285-295, 2007.
Whitby et al., Shear-Induced Coalescence of Oil-in-Water Pickering Emulsions, Journal of Colloid and Interface Science, 361, pp. 170-177, 2011.

* cited by examiner

*Primary Examiner* — Kara Boyle
(74) *Attorney, Agent, or Firm* — Morgan, Lewis & Bockius LLP

(57) ABSTRACT

The present invention relates to a Pickering destabilisation method. The present invention also relates to a method for phase separation, and specifically to a method for separating hydrocarbons for hydrocarbon extraction, as well as to a method for manufacturing porous substrates and to a method for manufacturing finished products.

19 Claims, 5 Drawing Sheets

METHOD FOR DESTABILIZING A PICKERING EMULSION

Figure 1:
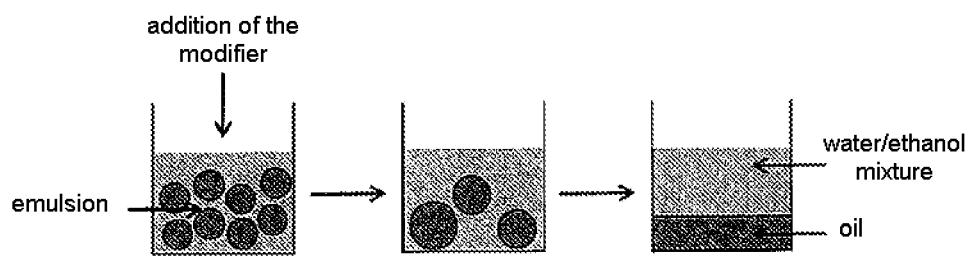

The present invention relates to a process for destabilization of a Pickering emulsion. It also relates to a process for the separation of phases and more particularly to a process for the separation of hydrocarbons for the extraction of hydrocarbons, and also to a process for the manufacture of porous substrates and to a process for the manufacture of finished products.

Emulsions are systems which include two liquids which are immiscible or which have a very limited miscibility with one another. One of these liquids is a dispersed phase consisting of fine droplets of organic phase which are dispersed in a continuous aqueous phase. Although metastable, emulsions can remain stable for several months or several years by virtue of the incorporation of surfactants, which are adsorbed at the interfaces of the continuous and dispersed phases and thus inhibit the coalescence of the droplets. Surfactants are amphiphilic molecules which exhibit a lipophilic (which retains the fatty substances) and nonpolar part and a hydrophilic (water-miscible) and polar part. This structure makes it possible to modify the surface tension between the dispersed phase and the continuous phase. The use of surfactants can nevertheless have negative effects on the environment and health (irritation of the skin, toxicity). Furthermore, a large amount of surfactants is necessary in order to maintain the stability of the interface as a result of the rapid dynamics of sorption/desorption at the interface.

Surfactants can be replaced by solid particles which are adsorbed at the surface of the droplets, creating a sort of "protective shield" which stabilizes the emulsion: reference is then made to Pickering emulsions (W. Ramsden, Separation of Solids in the Surface-layers of Solutions and "Suspensions", Jun. 8, 1903; H. E. Armstrong et al., Journal of the Chemical Society, Pickering: Emulsions, 1907). These surfactant-free and relatively nontoxic emulsions are stabilized by colloidal particles. These systems are undergoing a revival of interest insofar as it is today preferable, for ecological reasons, to limit the use of synthetic surfactants.

As a result of the presence of particles strongly anchored at the interfaces, Pickering emulsions exhibit very novel properties in comparison with conventional emulsions. This is because the emulsions obtained are much more stable than their homologues stabilized by surfactant molecules. In the conventional case of emulsions stabilized by surfactant molecules, the interfaces are "liquid", whereas, in the case of Pickering emulsions, the presence of particles renders the interface "solid" and very strong. The Gibbs free energy necessary to detach the particles present at the interface of the emulsions is much greater than for surfactants (D. E. Tambe et al., Journal of Colloid and Interface Science, 162, 1-10, 1994; Aveyard et al., Phys. Chem. Phys., 2003, 5, 2398-2409). This is the reason why these particles are irreversibly "attached" to the interface (Aveyard et al., 2003), unlike molecular surfactants, which are always in equilibrium between the interface and the opposing phases.

Thus, the particles adsorbed at the interface confer, on Pickering emulsions, novel macroscopic properties, such as resistance to dehydration and exceptional elasticity, these properties being related to the solid nature of the interface.

In contrast to surfactant molecules, which are continually adsorbed and desorbed, in the case of Pickering emulsions, the particles are adsorbed at the interfaces under the effect of stirring and irreversibly. Thus, once a Pickering emulsion is stable, it is difficult to destabilize it.

Nevertheless, there is an advantage in destabilizing Pickering emulsions, this being the case in order to mix emulsions which would have been stored for a lengthy period or also in order to separate the opposing phases. This is because the destabilization makes it possible to separate the hydrophilic and hydrophobic phases and to reuse one or indeed both phases separately. The two phases of the Pickering emulsion can be used to store different molecules (some hydrophilic, others hydrophobic) in one and the same container, without them coming into contact with one another. The destabilization of the emulsion makes it possible, in this case, to bring the different molecules into contact and results, for example, in chemical reactions which confer novel properties on the mixture.

Several methods for the destabilization of Pickering emulsions have been described in the literature:
- destabilization by application of an external electric field, which uses an electric field to destabilize the Pickering emulsion (Hwang et al., Electrophoresis, 2010, 31, 850-859). This method requires the presence of dielectric particles in order to stabilize the emulsion. The destabilization mechanism is based on the migration of the particles under the action of the electric field (dielectrophoresis), thus leaving regions of the interface free of particles,
- destabilization by application of an external magnetic field: Melle et al. (Langmuir, 2005, 21, 2158 2162) use a magnetic field to destabilize a Pickering emulsion of decane in water (oil-in-water emulsion) comprising magnetic particles. Beyond a critical magnetic field value, the emulsion destabilizes and results in the formation of two separate phases,
- destabilization by use of microwaves: microwaves can in some cases prove to be effective in demulsifying Pickering emulsions (Xia et al., Journal of Macromolecular Science, Part A: Pure and Applied Chemistry, 43: 71-81, 2006). However, this method does not make it possible to obtain complete breakdown of the emulsion (at most 82%, under optimum conditions),
- destabilization by a pH effect: the study of the behavior of $P4VP/SiO_2$ nanocomposite microgels as a function of the pH has shown that the particles have a hydrophilic/lipophilic balance which varies strongly as a function of the pH of the emulsion (Fujii et al., Adv. Mater., 2005, 17, No. 8, April 18). Nevertheless, this method applies only to very specific particles, the hydrophilic/lipophilic balance of which varies strongly as a function of the pH,
- destabilization by application of a mechanical force (Subramaniam et al., Nature, Vol. 438, 15, December 2005), which compels the coalescence of bubbles in the water but without making possible complete breakdown of the emulsion.

Blocked coalescence is a phenomenon which occurs when the droplets are stabilized by nanoparticles with a degree of covering close to saturation. This mechanism has already been described by Studart et al. (J. Phys. Chem. B, Vol. 113, No. 12, 2009): droplets of toluene dispersed in water and stabilized by a mixture of silica nanoparticles and hexadecyltrimethylammonium bromide (CTAB) result in a blocked coalescence after the toluene droplets have accumulated at the water/air interface. The droplets do not coalesce instantaneously and retain their spherical shape for a few seconds. However, the handling/modification of the droplets has to take place rapidly as, after a brief period of time, the droplets spontaneously coalesce. Thus, it is difficult to control the spatial arrangement of the drops at the time of destabilization.

The Inventors have now found that it is possible to destabilize Pickering emulsions of the oil-in-water or oil-in-alcohol type in a controlled manner, via a physicochemical impact. This destabilization makes it possible to control the spatial arrangement of the droplets and to render this arrangement permanent by a blocked coalescence after a variable and controlled time, it being possible for the droplets thus to be handled for a suitable duration. The process which is a subject matter of the present invention makes it possible either to obtain nonspherical droplets, the assembling of nonspherical drops making it possible to produce materials having a greater variety of optical properties, or to separate (complete phase separation) the initial phases.

A first subject matter of the invention is thus a process for the destabilization of a Pickering emulsion comprising the following stages:
(i) the preparation of a Pickering emulsion comprising:
a continuous phase in which nanoparticles are suspended, and
a noncontinuous phase, which is an immiscible liquid dispersed in said continuous phase in the form of droplets,
(ii) the injection into the continuous phase of a solvent which is miscible with said continuous phase, so as to trigger a coalescence between the continuous and noncontinuous phases,
the noncontinuous phase/nanoparticles ratio by weight being between 4 and 20 000 and preferably between 100 and 10 000.

By definition, Pickering emulsions are dispersions of two immiscible phases devoid of surfactant which are stabilized by solid particles. The particles are functionalized in order to confer on them an "amphiphilic" nature and to make it possible to adsorb them at the interfaces.

The term "emulsion" refers, for its part, to a heterogeneous system in which an immiscible liquid (noncontinuous phase) is dispersed in another liquid in the form of droplets. The size of the droplets can vary from 10 nm to a few μm, for example 500 μm.

Within the meaning as understood by the invention, two liquids are said to be miscible when their mixture, whatever their proportions, results in a single homogeneous phase being obtained. Two liquids are said to be immiscible when the dissolution of the solute in the solvent is less than 5% by weight of the total amount of solute (under ambient temperature and pressure conditions).

The continuous phase can be chosen from water or an alcohol of formula R—OH, where R is a $C_1$ to $C_8$ and preferably $C_1$ to $C_4$ hydrocarbon chain.

The noncontinuous phase, also known as "dispersed phase", can be a mineral oil, a fluorinated oil, a fatty acid or a (meth)acrylate oligomer.

When the noncontinuous phase is a mineral oil, it can be composed of a mixture of hydrocarbons and more particularly of a mixture of alkanes of formula $C_nH_{2n+2}$, of alkenes of formula $C_nH_2$, of alkynes of formula $C_nH_{2n-2}$, in which n varies from 1 to 30, and of aromatic compounds, such as monocyclic aromatic compounds, for example benzene, toluene, xylene, and the like, or polycyclic compounds, for example naphthalene, anthracene, phenanthrene, and the like. The noncontinuous phase can be petroleum.

When the noncontinuous phase is a fluorinated oil, it can be chosen from perfluoroalkanes, perfluoroamines and perfluoroethers. Preferably, said fluorinated oil can be chosen from perfluoropentane, perfluorohexane, perfluorotripropylamine and perfluoropolyether.

When the noncontinuous phase is a fatty acid, the latter is preferably chosen from fatty acids of formula R'—COOH, where R' is a $C_1$ to $C_{32}$ and preferably $C_{10}$ to $C_{18}$ hydrocarbon chain. The most preferred fatty acids are oleic acid and tetradecanoic acid.

When the noncontinuous phase is a (meth)acrylate oligomer, the latter is preferably obtained from a (meth)acrylic acid and a di-, tri- or tetrahydroxylated polyol. Advantageously, the (meth)acrylate oligomer is chosen from tripropylene glycol diacrylate (TPGDA), ethylene glycol dimethacrylate, polyethylene glycol diacrylate (PEGDA), pentaerythritol triacrylate, trimethylolpropane triacrylate (TMPTA) and 1,6-hexanediol diacrylate. Polyethylene glycol diacrylate and 1,6-hexanediol diacrylate are the most preferred (meth)acrylate oligomers. The (meth)acrylate oligomer can be used in combination with a photoinitiator. Mention may be made, as examples of photoinitiators, of: α-diketones, such as benzil and diacetyl; thioxanthones, such as thioxanthone, 2,4-diethylthioxanthone, thioxanthone-1-sulfonic acid, isopropylthioxanthone-4-sulfonic, isopropylthioxanthone and 2-chlorothioxanthone; benzophenones, such as benzophenone, 4,4'-bis(dimethylamino) benzophenone, 4,4'-bis(diethyl-1-amino)benzophenone or 4,4'-diethylaminobenzophenone; propiophenones, such as 2-hydroxy-2-methylpropiophenone or 4'-isopropyl-2-hydroxy-2-methylpropiophenone; acetophenones, such as acetophenone, p-(dimethylamino)acetophenone, α,α'-dimethoxyacetoxyacetophenone, 2,2-dimethoxy-2-phenylacetophenone, p-methoxyacetophenone, 2-methyl-[4-(methylthio)phenyl]-2-morpholino-1-propanone, 2,2-diethoxyacetophenone, 4'-phenoxy-2,2-dichloroacetophenone, 2-benzyl-2-N,N-dimethylamino-1-(4-morpholinophenyl)but-1-one, 2,2-dimethoxy-2-phenylacetophenone or 2-hydroxy-2-methyl-1-phenylpropanone; quinones, such as anthraquinone, 2-ethylanthraquinone, 2-chloroanthraquinone or 1,4-naphthoquinone; α-hydroxy aryl ketones, such as 1-hydroxycyclohexyl phenyl ketone; halogenated compounds, such as phenacyl chloride or tribromomethyl phenyl sulfone; peroxides, such as di(tert-butyl) peroxide; and other compounds, such as benzyl dimethyl ketal, ethyl N-dimethylaminobenzoate or 2-hydroxy-2-methyl-1-phenylpropanone. Mention may be made, among the most preferred photoinitiators, of propiophenones and more particularly of 2-hydroxy-2-methylpropiophenone.

Advantageously, the ratio by weight of the continuous phase to the noncontinuous phase varies from 1 to 50%.

The present invention is independent of the type of nanoparticles used, it being possible for the latter to be chosen from silica, gold, iron oxide, cerium oxide, titanium dioxide and clay nanoparticles and quantum dots (semiconductive crystals of nanometric dimensions having a very strong fluorescence). However, according to a preferred embodiment, the nanoparticles are silica nanoparticles, the latter being commonly used to stabilize Pickering emulsions. Advantageously, the nanoparticles have a diameter of between 10 and 50 nm and preferably between 10 and 20 nm.

The concentration of nanoparticles, expressed by weight with respect to the continuous phase, can be between 0.1 and 20 $g \cdot l^{-1}$ and preferably between 0.1 and 0.5 $g \cdot l^{-1}$.

In order for the nanoparticles to satisfactorily stabilize the emulsions, the hydrophobicity of the nanoparticles has to have been surface-modified beforehand, in order to improve their adsorption at the continuous phase/noncontinuous phase interface. For example, in the case of silica nanoparticles, the latter can be modified by etherification of the silanol groups by an alcohol comprising a $C_4$ to $C_{12}$ carbon chain (formation of an Si—O—$CH_2$— group) or by grafting, at the surface of the nanoparticles, an organosilane of formula $R_nSiX_{(4-n)}$, in which n=1, 2 or 3, X is a hydrolyzable group, such as an alkoxy, halide or carboxylate group, and R is a nonhydrolyzable organic group which can carry a functional group which can react with the application medium, such as a linear or cyclic $C_1$ to $C_8$ hydrocarbon group and preferably an alkyl or an aromatic group. Said organosilane is preferably an organoalkoxysilane of formula $R_nSi(OR')_{(4-n)}$, in which n and R are as mentioned above and R' is a linear or cyclic $C_1$ to $C_8$ hydrocarbon group and preferably an alkyl or aromatic group. Mention may be made, among the most preferred organoalkoxysilanes, of diethoxydimethylsilane, trimethylethoxysilane or tetraethoxysilane. The grafting of the organosilanes is carried out by basic catalysis: the nanoparticles are placed in aqueous suspension at a pH of 9-10, the organosilane is subsequently added to the suspension and then the mixture is stirred for a time of between 2 and 12 hours. The degree of covering of the silica nanoparticles by the organosilane is characterized by the percentage of residual silanol groups present at the surface after grafting (by comparison with the surface of the nongrafted nanoparticles). The hydrophobicity of the nanoparticles varies as a function of this degree of covering.

In the case of relatively nonhydrophobic silica nanoparticles (relatively nongrafted nanoparticles), that is to say having a degree of covering of between 5% and 40%, the surface charge of the nanoparticles (electric charge present at the interface) is relatively high. In this case, the continuous phase is preferably an aqueous phase comprising a salt, said salt promoting the adsorption of the nanoparticles at the surface of the droplets. Preferably, the salt is sodium chloride NaCl, magnesium chloride $MgCl_2$ or lithium chloride LiCl. Said salt can be used in an amount of 5 to 20 $g \cdot l^{-1}$ and preferably between 10 and 20 $g \cdot l^{-1}$.

In the case of moderately or highly hydrophobic silica nanoparticles (moderately or highly grafted nanoparticles), that is to say having a degree of covering of between 40% and 85%, the surface charge of the nanoparticles is relatively low. In this case, the continuous phase is preferably an alcoholic suspension comprising an alcohol of formula R—OH, where R is a $C_1$ to $C_{20}$ and preferably $C_1$ to $C_{12}$ hydrocarbon chain.

Stage (i) thus consists of the preparation of a suspension of nanoparticles (continuous phase+nanoparticles) and then of the mixing thereof with a noncontinuous phase, in order to obtain a Pickering emulsion. The mixing can be carried out mechanically, for example by using a high-pressure homogenizer, an ultrasound system or a microfluidic system. The duration of the stirring must be sufficient to make possible the fixing of the nanoparticles at the continuous phase/noncontinuous phase interface, it being possible for this duration to range from 30 seconds to 10 minutes and preferably from 2 to 5 minutes. Stage (i) is preferably carried out at ambient temperature, that is to say at a temperature of between 20 and 25° C.

The coalescence takes place during a stage (ii) by injection of a liquid which is miscible with the continuous phase. The injection of the solvent can be carried out either by simple addition using a micropipette or under a flow rate controlled using a syringe-driver. The miscibility of said solvent in the continuous phase can be characterized by a partition coefficient $K_p$, i.e. the ratio of the concentration of the solvent in the continuous phase to the concentration of the solvent in the noncontinuous phase. Typically, said solvent exhibits a $K_p$ at least equal to 10.

The injection of a miscible solvent into the continuous phase during a stage (ii) produces a physicochemical impact which results in the destabilization of the droplets which are dispersed in the continuous phase. Thus, the stabilization of the droplets, guaranteed by a specific contact angle between the two phases and the nanoparticles, is broken down, which brings about the coalescence of the droplets.

The injection stage (ii) is preferably carried out at a flow rate of between $10^{-5}$ and $10^{-2}$ $m^3/h$ and preferably between $10^{-4}$ and $10^{-3}$ $m^3/h$. Gentle stirring makes it possible to improve the effectiveness of action of the miscible liquid; however, this stirring is not essential to the breakdown of the emulsion. The triggering mechanism for the coalescence is represented diagrammatically in FIG. 1. If the amount of miscible liquid injected is sufficient, complete phase separation occurs.

The miscible solvent can be:
- water, when the continuous phase is an alcohol of formula R—OH, where R is a $C_1$ to $C_8$ and preferably $C_1$ to $C_4$ hydrocarbon chain, or
- an alcohol of formula R—OH, where R is a $C_1$ to $C_8$ and preferably $C_1$ to $C_4$ hydrocarbon chain, when the continuous phase is water.

The amount of miscible solvent added to completely demulsify the system depends on the degree of adsorption of the nanoparticles at the surface of the droplets: the higher this degree, the more difficult it will be to completely separate the phases. If this degree is greater than 80%, the coalescence may not be triggered or will not take place completely. Preferably, the degree of adsorption of the nanoparticles at the surface of the droplets is between 10% and 80% and preferably between 40% and 60%. The addition of an amount of miscible solvent between 10% and 20% by volume, with respect to the volume of the continuous phase, is generally sufficient to trigger the coalescence mechanism. In order to achieve complete separation of the two phases, it may be necessary either to more vigorously stir the system, for example by mechanical stirring, or to increase the amount of miscible solvent added. In the absence of stirring, the amount of miscible solvent necessary to achieve complete separation of the phases is generally between 40% and 70% by volume, with respect to the total volume of the continuous phase. Generally, the amount of miscible solvent can be between 10% and 70% and preferably between 10% and 50% by volume, with respect to the volume of the continuous phase, and it can be between 5% and 50% by volume, with respect to the volume of the noncontinuous phase.

Figure 2:
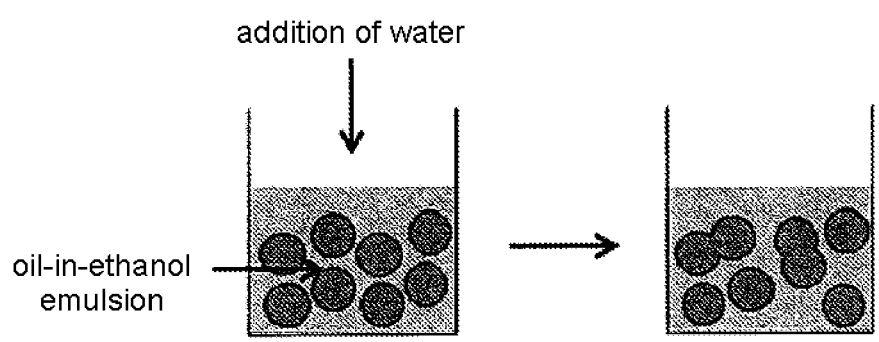

In a specific embodiment, in the case where the noncontinuous phase is dispersed in an alcohol, the coalescence triggered by the miscible solvent can be blocked in order to result in the formation of nonspherical droplets. The specific case of an oil-in-ethanol emulsion destabilized by addition of a small amount of water is illustrated in FIG. 2.

The blocked coalescence is a partially reversible phenomenon, which means that it is possible, in some cases, to cause the nonspherical droplets obtained to relax in order for them to regain a spherical shape. For this, the nonspherical droplets obtained during the blocked coalescence have to be rinsed, for example using an alcoholic solution, such as, for example, an ethanol solution. The amount of alcohol used can be at least equal to five times the volume of the continuous phase. After this rinsing stage, completely spherical droplets, slightly larger than in the initial emulsion, are obtained. The formation of nonspherical droplets is again possible, for example by addition of water, which triggers a second blocked coalescence. These cycles can be repeated several times, up to five or six times, without difficulty.

The process of the invention can be used to confine, for a storage period of arbitrary duration, incompatible phases whose mixing is necessary for the properties of use of the finished product. This can be the case in the fields of cosmetics, the food industry and pharmacology for the preparation in situ of active principles which are unstable over time.

The process of the invention can also comprise an additional stage of separation (or demulsification) of the continuous and noncontinuous phases: after separation by settling, one of the two phases is recovered by pumping. It can in particular concern a process of separation of hydrocarbons for the extraction of hydrocarbons in which the continuous phase is water, the noncontinuous phase is composed of a mixture of hydrocarbons or petroleum, the nanoparticles are natural nanoparticles present in the ground, such as, for example, clay, and the miscible solvent is an alcohol, such as, for example, ethanol.

The present invention also relates to a process for the manufacture of porous substrates comprising stages (i) and (ii) as defined above, followed by a stage of drying of the coalesced phase obtained on conclusion of stage (ii). Said drying stage can be carried out in an oven at a temperature of between 20 and 60° C. for 15 to hours. After complete evaporation of the liquid phases of the emulsion, the residue is composed of aggregated solid particles which may form a matrix. The properties of the final matrix (porosity, stiffness, specific surface) depend strongly on the size and on the shape of the droplets of the initial emulsion. The drying of emulsions composed of nonspherical droplets thus makes it possible to obtain porous materials having novel properties. The materials obtained can in particular be catalyst supports, gas and moisture sensors, filtration materials or anisotropic materials, such as photonic crystals.

Finally, another subject matter of the invention is a process for the manufacture of finished materials comprising stages (i) and (ii) as defined above, in which process the noncontinuous phase is a (meth)acrylate oligomer, followed by a stage of polymerization, preferably carried out under UV irradiation.

Figure 3:
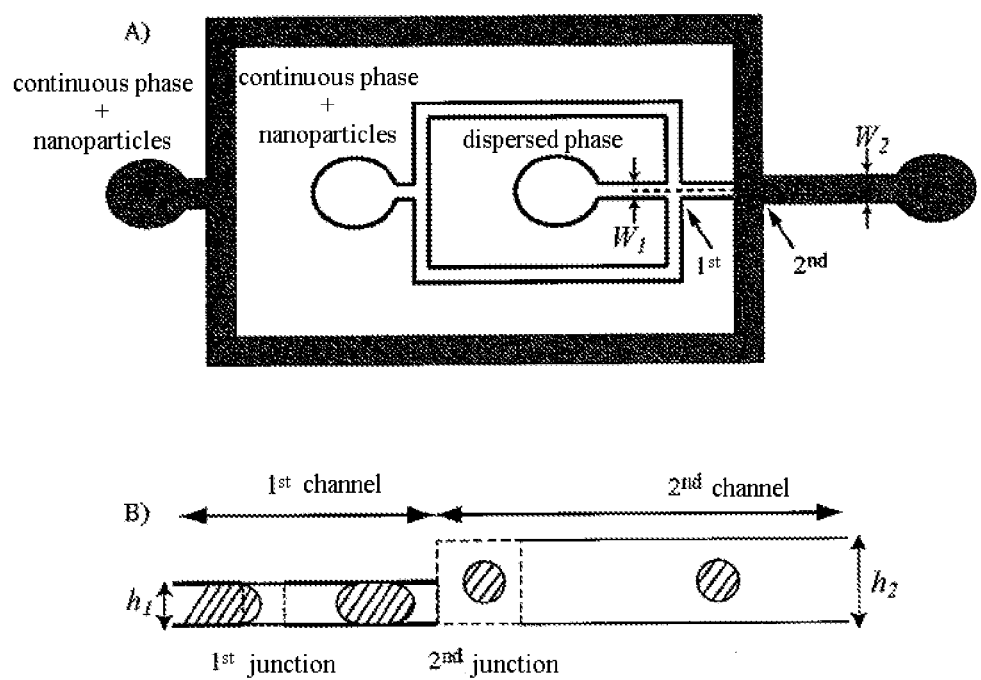
Figure 4:
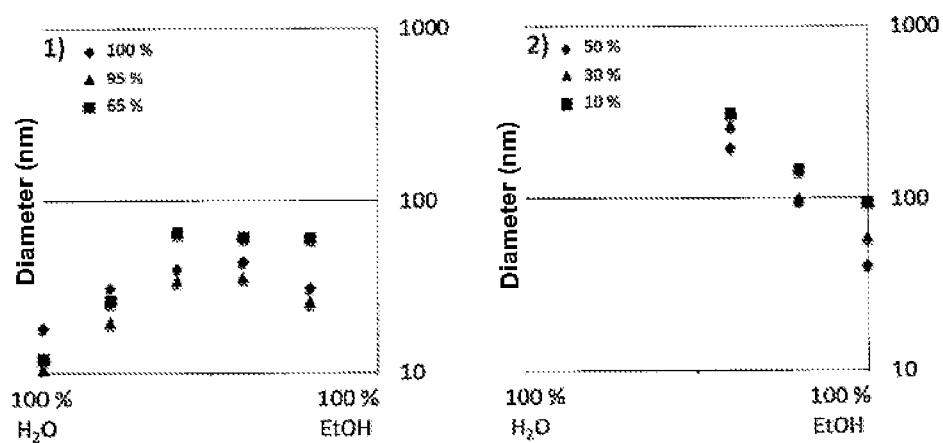

In addition to the arrangements which precede, the invention also comprises other arrangements which will emerge from the remaining description which follows, which relates to examples demonstrating the advantageous properties of the process of the invention and also to the appended figures, in which:

FIG. 1 illustrates the process of the invention, the coalescence being triggered by addition of a miscible liquid to the continuous phase, FIG. 2 illustrates the destabilization of an oil-in-ethanol emulsion by addition of a small amount of water to the continuous phase, FIG. 3 represents a microfluidic chip: A) Top view, and B) Cross sectional view (along the dotted lines of the top view), FIG. 4 represents the state of dispersion of nanoparticles by measurement of their hydrodynamic diameter by dynamic light scattering, FIG. 5 indicates the percentages by volume of miscible liquid to be added to a continuous ethanol phase, in which a fluorinated oil stabilized by silica nanoparticles is dispersed, in order to trigger the coalescence (expressed as percentage of residual silanol functional groups, 100% corresponding to the most hydrophilic nanoparticles).

EXPERIMENTAL PART

Example 1

Process for the Destabilization of a Pickering Emulsion According to the Invention Synthesis of Silica Nanoparticles:

The silica nanoparticles used for the stabilization of the emulsion are synthesized in a 20 ml jacketed beaker provided with a magnetic stirrer and thermostatically controlled using circulation of water regulated at a temperature of 60° C. 20 ml of an aqueous arginine solution having a concentration of $6 \times 10^{-3}$ mol·l$^{-1}$ are subsequently added. After stirring for 15 minutes, 537 mmol of tetraethoxysilane are introduced into the beaker. Stirring is subsequently maintained at a speed of 500 revolutions per minute for a period of time of 48 hours.

The $SiO_2$ nanoparticles obtained have the following characteristics:
 a diameter of between 10 and 20 nm,
 a very low polydispersity; the size distribution is Gaussian with a standard deviation s=0.8 nm,
 a density of 2.2 g·cm$^{-3}$.

The surface of the nanoparticles is covered with silanol Si—OH groups, which confers a highly hydrophilic nature on them. In order for the nanoparticles to be able to be adsorbed at the interface of the dispersed and continuous phases, it is necessary to render them partially hydrophobic. This modification is described in the procedure below.
Modification of the Surface of the Nanoparticles:

200 ml of the suspension of nanoparticles prepared above are placed in a flask provided with a magnetic bar. 1 ml of trimethylethoxysilane is subsequently added. The mixture is stirred at 750 revolutions per minute using a magnetic stirrer for a period of time of 8 hours.

The grafted nanoparticles are subsequently washed with water and the dispersion solvent is removed by ultrafiltration under pressure using a 30 kD membrane. Three rinsing operations are subsequently carried out with 50 ml of pure water in order to completely remove the synthesis solvent.
Preparation of the Pickering Emulsion:

Different Pickering emulsions were prepared according to distinct methods of preparation.
 In these emulsions:
  the continuous phase is either water or ethanol comprising silica nanoparticles as prepared above, at a concentration of 0.4 g·l$^{-1}$,
  the dispersed phase is a fluorinated oil: perfluorotripropylamine FC-3283 (3M France).
1st Method of Preparation: Use of a Mechanical Stirring Device The suspension of silica nanoparticles formed above is diluted to a concentration of 0.4 g·l$^{-1}$.

The two phases to be emulsified are placed in a sample tube and then stirred vigorously according to different methods:
 by manual stirring for a period of time of 30 seconds,
 by mechanical stirring using an IKA Ultraturrax® T8.01 high-pressure homogenizer at 25 000 revolutions/minute for 10 seconds, by manual stirring for 10 seconds, in order to form a coarse dispersion, followed by ultrasonication of the mixture with a Bioblock Scientific 88169 device for 1 minute.

The noncontinuous phase or continuous phase concentration of the emulsion is 10% and the noncontinuous phase/nanoparticles ratio by weight is 250.

2nd Method of Preparation: Use of a Microfluidic Device

The suspension of silica nanoparticles formed above is diluted to a concentration of 0.4 g·l$^{-1}$.

The two phases to be emulsified are injected into a microfluidic chip and then sheared at a junction with a width of 50 μm and a height of 10 μm. In this embodiment, the local shearing is controlled, which makes possible good reproducibility during the formation of the droplets, the latter consequently being monodispersed.

Several shearing geometries already described in the literature can be used, such as, for example, convergent flows referred to as flow focusing (Anna et al., Appl. Phys. Lett., Vol. 82, No. 3, 20 Jan. 2003), coaxial flows (Umbanhowar et al., Langmuir, Vol. 16, No. 2, 2000), T-junction flows and terrace flows (Kobayashi et al., Colloids and Surfaces A: Physicochem. Eng. Aspects, 296 (2007), 285-289). In this example, a hybrid shear geometry, such as that described by Mallogi et al., (Appl. Phys. Lett., Vol. 82, No. 3, 20 Jan. 2010), was used. Three syringes comprising the two immiscible phases (one syringe containing the dispersed phase and two syringes containing the continuous phase with the modified silica nanoparticles) are placed on three syringe drivers. The fluids are dispensed at set flow rates:

$Q_{dispersed\ phase}$=0.3 μl/min,
$Q_{continuous\ phase\ 1}$=7 μl/min,
$Q_{continuous\ phase\ 2}$=1.5 μl/min.

The microfluidic chip is represented in FIG. 3. The phase to be dispersed is sheared at a first convergent flow (width $W_1$=50 μm, height $h_1$=10 μm) by the continuous phase comprising the modified nanoparticles. The droplets formed emerge in a new convergent flow which is wider and higher (width $W_2$=100 μm, height $h_2$=100 μm). The droplets are then entrained by a new inflow of continuous phase comprising the modified nanoparticles over a distance of several tens of centimeters in order for the nanoparticles to be able to be effectively adsorbed on the surface of the droplets, this being the case before the droplets come into contact with one another. The residence time is of the order of 20 seconds, which is sufficient for the amount of nanoparticles adsorbed to prevent the coalescence of the droplets formed. The Pickering emulsion thus formed, the noncontinuous phase/continuous phase concentration of which is 3% and the noncontinuous phase/nanoparticles ratio by weight of which is 75, is collected directly at the outlet of the microfluidic chip and stored for subsequent use.

Triggering of the Coalescence of the Emulsion:

The layer of nanoparticles is destabilized by modification of the hydrophilic/lipophilic balance of the continuous phase:

either by addition of water to the ethanol using a micropipette, so as to render the continuous phase more hydrophilic, or by addition of ethanol to the water using a micropipette, in order to render the continuous phase more hydrophobic.

The state of dispersion of the nanoparticles is then modified and results in the formation of aggregates, as is shown in FIG. 4. The nanoparticles initially dispersed in the water aggregate together when ethanol is added (1st graph) and the nanoparticles initially dispersed in the ethanol aggregate together when water is added (2nd graph).

Figure 5:
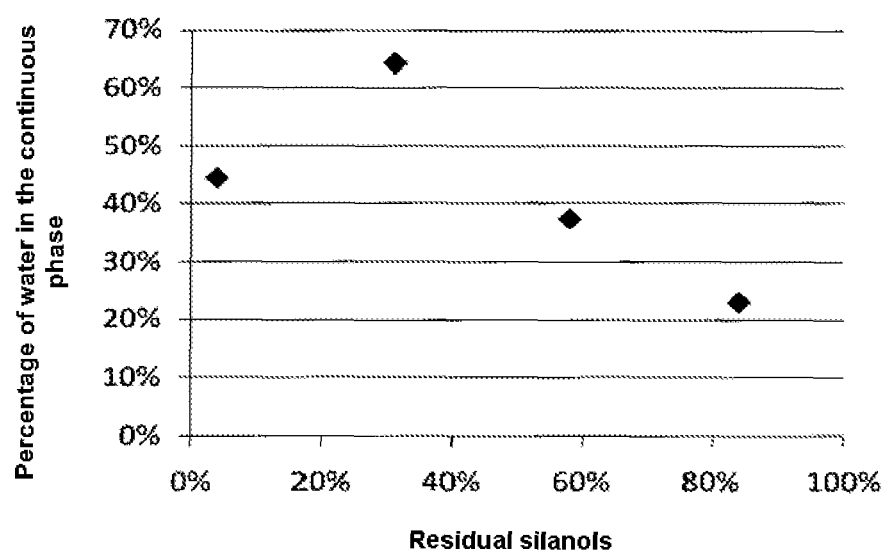

Formation of Nonspherical Droplets:

The percentages by volume of miscible liquid to be added to a continuous phase in order to trigger the coalescence, in the case of emulsions of fluorinated oil dispersed in ethanol, are shown in FIG. 5.

It is observed that the amount of water to be added increases with the hydrophobicity of the particles and then decreases for very hydrophobic particles.

Example 2

Process for the Extraction of Hydrocarbons 2 ml of an aqueous solution, comprising water $H_2O$, 10 g·l$^{-1}$ of sodium chloride NaCl and 4 g·l$^{-1}$ of silica nanoparticles, and 2 ml of hexadecane are incorporated in an 8 ml sample tube.

The emulsion is formed by mechanical stirring using an IKA Ultraturrax® T8.01 high-pressure homogenizer at 25 000 revolutions/minute for a period of time of 2 minutes.

The noncontinuous phase/continuous phase concentration of the emulsion is 50% and the continuous phase/nanoparticles ratio by weight is 450.

The emulsion formed is subsequently stirred with a magnetic stirrer at 250 rpm. Ethanol (immiscible solvent) is subsequently injected into the Pickering emulsion prepared above by dipping a capillary tube in the sample tube and by applying a flow rate of $10^{-3}$ m$^3$/h for a total volume of ethanol equal to 50% of the continuous phase.

The dispersed phase, i.e. the hexadecane, is no longer in the emulsion form: two phases have formed in the sample tube. The hexadecane, which is lighter, is located above the water. The hexadecane is recovered using a pasteur pipette.

Example 3

Process for the Manufacture of a Filter 2 ml of an aqueous solution, comprising water $H_2O$, 10 g·l$^{-1}$ of sodium chloride and 10 g·l$^{-1}$ of silica nanoparticles, and 2 ml of a polymerizable (meth)acrylate oligomer, 1,6-hexanediol diacrylate, and also 1% by weight of 2-hydroxy-2-methylpropiophenone are incorporated in an 8 ml sample tube. The emulsion is formed by mechanical stirring using an IKA Ultraturrax® T8.01 high-pressure homogenizer at 25 000 revolutions/minute for a period of time of 2 minutes.

The noncontinuous phase/continuous phase concentration of the emulsion is 50% and the continuous phase/nanoparticles ratio by weight is 180.

The emulsion formed is subsequently stirred with a magnetic stirrer at 250 rpm. Ethanol (immiscible solvent) is subsequently injected into the Pickering emulsion prepared above by dipping a capillary tube in the sample tube and by applying a flow rate of $10^{-4}$ m$^3$/h for a total volume of solvent equal to 5% of the continuous phase, this being done in order to form nonspherical droplets.

The sample tube is subsequently placed under a Hamamatsu LC8 UV lamp (4500 mW·cm$^{-2}$, wavelength 300 nm 450 nm) for 1 minute. Particles are thus obtained which are subsequently recovered and then dried in an oven at a temperature of 50° C. for 24 hours. The powder thus dried is subsequently used to prepare a filter.

The invention claimed is:

1. A process of destabilizing a Pickering emulsion comprising:
   (i) preparation of a Pickering emulsion comprising:
      a continuous phase in which nanoparticles are suspended, and
      a non-continuous phase, which is an immiscible liquid dispersed in said continuous phase in the form of droplets,
   (ii) injection into the continuous phase of a solvent which is miscible with said continuous phase, so as to trigger coalescence between the continuous and non-continuous phases, the non-continuous phase/nanoparticles ratio by weight being between 4 and 20,000, and
   (iii) separation, by pumping, either of the continuous phase or of the noncontinuous phase,
      wherein the solvent is (a) water when the continuous phase is an alcohol of formula R—OH, in which R is a $C_1$ to $C_8$ hydrocarbon chain, or (b) an alcohol of formula R—OH, in which R is a $C_1$ to $C_8$ hydrocarbon chain when the continuous phase is water.

2. The process as claimed in claim 1, in which the non-continuous phase/nanoparticles ratio by weight is between 100 and 10,000.

3. The process as claimed in claim 1, in which the continuous phase is chosen From water or an alcohol of formula R—OH where R is a $C_1$ to $C_8$ hydrocarbon chain.

4. The process as claimed in claim 1, in which the non-continuous phase is a mineral oil, a fluorinated oil, a fatty acid or a (meth)acrylate oligomer.

5. The process as claimed in claim 1, in which the non-continuous phase is a mineral oil comprising a mixture of hydrocarbons.

6. The process as claimed in claim 1, in which the non-continuous phase is a (meth)acrylate oligomer selected from the group consisting of tripropylene glycol diacrylate (TPGDA), ethylene glycol dimethacrylate, polyethylene glycol diacrylate (PEGDA), pentaerythritol triacrylate, trimethylolpropane triacrylate (TM PTA) and 1,6-hexanediol diacrylate.

7. The process as claimed in claim 1, in which the amount of the solvent injected during stage (ii) represents between 10% and 70% by volume, with respect to the total volume of the continuous phase.

8. The process as claimed in claim 1, in which the nanoparticles are selected from the group consisting of silica, gold, iron oxide, cerium oxide, titanium dioxide or clay nanoparticles and quantum dots.

9. The process as claimed in claim 1, in which the nanoparticles have a diameter of between 10 and 50 nm.

10. The process as claimed in claim 1, in which the concentration of nanoparticles is between 0.1 and 20 $g \cdot l^{-1}$ with respect to the continuous phase.

11. The process as claimed in claim 1, in which the nanoparticles are silica nano-particles modified at the surface by etherification of the silanol groups by an alcohol or by grafting an organosilane at their surface.

12. The process as claimed in claim 11, in which the organosilane is an organoalkoxysilane.

13. The process as claimed in claim 11, in which the continuous phase is water and the degree of covering of the silica nanoparticles by the organosilane is between 5% and 40%.

14. The process as claimed in claim 11, in which the continuous phase is an alcohol of formula R—OH, where R is a $C_1$ to $C_8$ hydrocarbon chain, and the degree of covering of the silica nanoparticles by the organosilane is between 40% and 85%.

15. The process as claimed in claim 1, in which the solvent is injected into the continuous phase at a flow rate of between $10^{-5}$ and $10^{-2}$ m³/h during stage (ii).

16. A process of manufacturing porous substrates, comprising stages (i), (ii), and (iii) as defined according to claim 1, followed by a stage of drying of the coalesced phase obtained on conclusion of stage (iii).

17. A process of manufacturing finished materials, characterized in that it comprises stages (i), (ii), and (iii) as defined according to claim 1, followed by a stage of polymerization under UV irradiation, and in that the non-continuous phase is a (meth)acrylate oligomer.

18. A process of destabilizing a Pickering emulsion comprising:
   (i) preparation of a Pickering emulsion comprising:
      a continuous phase in which nanoparticles are suspended, and
      a noncontinuous phase, which is an immiscible liquid dispersed in said continuous phase in the form of droplets,
   (ii) injection into the continuous phase of a solvent which is miscible with said continuous phase, so as to trigger a coalescence between the continuous and noncontinuous phases,
   the noncontinuous phase/nanoparticles ratio by weight being between 4 and 20,000,
      wherein the nanoparticles are silica nano-particles modified at the surface by grafting an organoalkoxysilane at their surface; and the solvent is (a) water when the continuous phase is an alcohol of formula R OH, in which R is a C1 to C8 hydrocarbon chain, or (b) an alcohol of formula R OH, in which R is a C1 to C8 hydrocarbon chain when the continuous phase is water.

19. A process of destabilizing a Pickering emulsion comprising:
   (i) preparation of a Pickering emulsion comprising:
      a continuous phase in which nanoparticles are suspended, and
      a noncontinuous phase, which is an immiscible liquid dispersed in said continuous phase in the form of droplets,
   (ii) injection into the continuous phase of a solvent which is miscible with said continuous phase, so as to trigger a coalescence between the continuous and noncontinuous phases,
   the noncontinuous phase/nanoparticles ratio by weight being between 4 and 20,000,
      wherein the solvent is (a) water when the continuous phase is an alcohol of formula R OH, in which R is a C1 to C8 hydrocarbon chain, or (b) an alcohol of formula R OH, in which R is a C1 to C8 hydrocarbon chain when the continuous phase is water; and the solvent is injected into the continuous phase at a flow rate of between $10^{-5}$ and $10^{-2}$ m³/h during stage (ii).

* * * * *